United States Patent [19]

Speed

[11] Patent Number: 4,596,216

[45] Date of Patent: Jun. 24, 1986

[54] FUEL METER

[75] Inventor: Robert F. Speed, Nanaimo, Canada

[73] Assignee: Microfuel Technologies Inc., Nanaimo, Canada

[21] Appl. No.: 383,462

[22] Filed: Jun. 1, 1982

[51] Int. Cl.$^4$ .......................................... F02M 39/00
[52] U.S. Cl. .................................... 123/357; 123/494;
73/119 A
[58] Field of Search ................................ 123/357–359,
123/494; 73/119 A, 113

[56] References Cited

U.S. PATENT DOCUMENTS

| | | | |
|---|---|---|---|
| 3,407,793 | 10/1968 | Lang | 123/357 |
| 3,636,933 | 1/1972 | Ohanti | 123/357 |
| 4,335,695 | 6/1982 | Phipps | 123/357 |
| 4,337,839 | 7/1982 | Taplin | 123/357 |
| 4,426,979 | 1/1984 | Tung | 123/438 |

Primary Examiner—Carl Stuart Miller
Attorney, Agent, or Firm—Michael M. Sakovich

[57] ABSTRACT

Apparatus for measuring fuel consumption in an internal combustion engine having controllable fuel injectors that meter fuel to corresponding cylinders at predetermined delivery rates under throttle control senses the amount of fuel being delivered to each cylinder by a potentiometer that generates a signal which is proportional to the linear displacement of a throttle rack gear. In one embodiment a transducer generates another signal proportional to the rotary speed of the engine and both signals are amplified at a fixed gain corresponding to the number of working engine cylinders to produce a product signal that is applied to an analog meter or a digital display circuit which indicate the rate of engine fuel consumption. Another embodiment is provided with a totalizer circuit that is responsive to the product signal relative to a predetermined time frame for indicating the total fuel consumed and both embodiments function to provide accurate readings without opening any fuel piping systems to meter and register fuel flow.

7 Claims, 3 Drawing Figures

FUEL METER

BACKGROUND OF THE INVENTION

The present invention relates generally to fuel consumption measuring devices and more particularly to a method and apparatus for measuring fuel consumption in an internal combustion engine having a fuel injection system.

As a class of internal combustion engines, diesel engines employ a fuel injection system having a pump and a plurality of injectors that meter fuel therefrom to corresponding engine cylinders at various delivery rates depending on such factors as engine load and desired speed. A common characteristic of fuel systems used in diesel engines is the requirement for a fuel return system that collects overflow fuel at each fuel injector of an engine and returns such fuel to the fuel tank for subsequent distribution to the fuel injectors. Such system may comprise a fuel distribution head having an outlet feed line leading to the fuel injectors which include internal fuel return passages communicating with a by-pass line for carrying unburned fuel to the return line and thence to the fuel tank. Additionally, there is a second outlet to return the fuel pump overflow that is delivered to the distribution head. In this form of fuel supply system, approximately two-thirds of the fuel passing through the fuel pump remains in circulation which presents a problem in monitoring actual fuel consumed.

Complexity and expense are coextensive problems that accompany known systems for measuring fuel consumption in diesel engines, mainly because of drastic alterations that have to be made to the fuel piping systems in order to meter and register the difference in flow to the fuel pump and from the return line.

Inaccuracy of readings is another problem that exists for the reason that any system of metering which is subject to the limitations of standard fluid metering techniques and apparatus is prone to the faults and limitations inherent therein. For example, factors which limit the accuracy of known fuel consumption measuring systems include, fluctuations in fuel pressure, fuel temperature, specific gravity, erosion, leaks, blockages, entrained air, and the like. All inhibit the accuracy of such systems to a greater or lesser degree.

SUMMARY OF THE INVENTION

A principal object of the present invention is to provide apparatus for measuring fuel consumption in an internal combustion engine having a fuel injection system in which the fuel injectors of the system provide an accurate means for monitoring unit charges of fuel consumed.

Another object of the invention is to provide apparatus for measuring fuel consumption in an internal combustion engine without requiring drastic alterations to the fuel piping system.

Another object of the invention is the provision of such apparatus that measures directly the quantity of fuel consumed.

Still another object of the invention is the provision of such apparatus that provides a reliable and economical means for measuring fuel consumption.

Yet another object of the invention is to provide a system and apparatus for measuring the rate of fuel consumption together with total volume of fuel consumed.

The problems associated with the prior art may be substantially overcome and the foregoing objects and provisions achieved by recourse to the present invention which relates, in one aspect, to apparatus for measuring fuel consumption in an internal combustion engine having a plurality of injectors metering fuel to corresponding engine cylinders at a delivery rate variably responsive to a throttle control including translation means for controlling the fuel charge of each injector. The apparatus comprises, in combination, monitor means generating a first signal proportional to the rotary speed of the engine, sensor means linked to the translation means and responsive thereto for generating a second signal proportional to the fuel charge of one injector; multiplier means coupled to the monitor and sensor means for generating an output signal corresponding to the product of the first and second signals and a constant multiplier corresponding to the number of working engine cylinders, and display means coupled to the multiplier means and responsive to the output signal for displaying a rate of engine fuel consumption.

Another aspect of the present invention relates to a method for measuring fuel consumption in an internal combustion engine having a plurality of injectors metering fuel to corresponding engine cylinders at a delivery rate variably responsive to a throttle control including translation means for controlling the fuel charge of each injector. The method comprises the steps of, generating a first signal proportional to the rotary speed of the engine, generating a second signal proportional to the fuel charge of one injector, generating an output signal corresponding to the product of the first and second signals and a constant multiplier corresponding to the number of working engine cylinders, and displaying a rate of engine fuel consumption corresponding to the output signal.

DESCRIPTION OF THE DRAWINGS

The invention will now to be more particularly described with reference to embodiments thereof shown, by way of example, in the accompanying drawings in which.

DESCRIPTION OF THE ILLUSTRATED EMBODIMENTS

Figure 1:
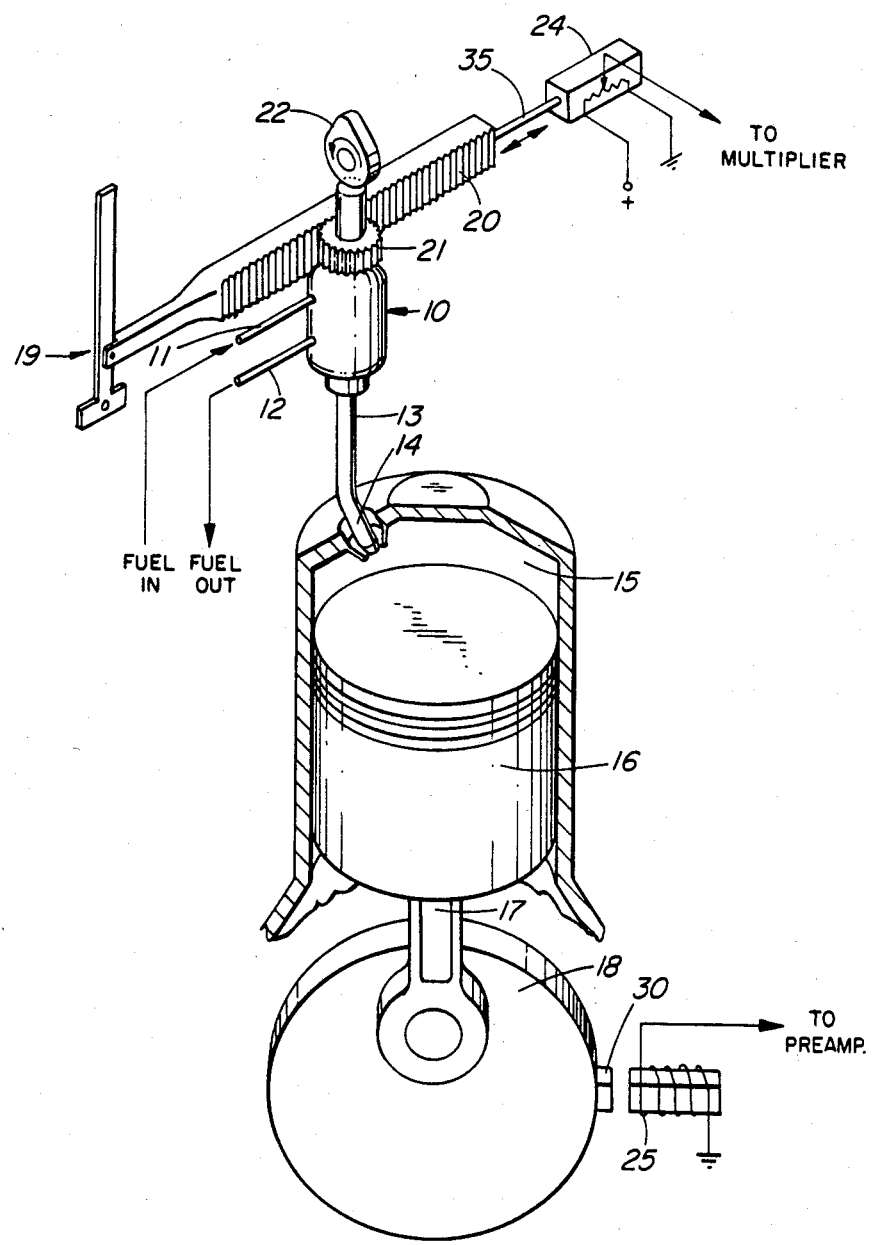
FIG. 1 is a diagrammatic perspective view of apparatus according to the present invention linked to a throttle control for controlling the fuel charge of a fuel injector.

FIG. 1 illustrates diagrammatically a portion of a fuel metering system of a diesel engine having a fuel injection pump (not shown) feeding a plurality of injectors which meter fuel to corresponding engine cylinders. Shown therein is a fuel injector 10 having a fuel input line 11, a fuel overflow line 12 and a fuel output line 13 leading to a fuel injector nozzle 14. The nozzle 14 is shown disposed within an engine cylinder 15 in which is conventionally disposed a reciprocable piston 16 connected by means of a connecting rod 17 to a crank shaft 18.

Speed control of the engine is performed conventionally by means of a throttle 19 that includes translation means shown as a rack gear 20 engaging a pinion gear 21 that controls the fuel charge of the injector 10. As fuel flows continuously through the lines 11 and 12, a predetermined fuel charge for the cylinder 15 is set by the gear 21 which translates linear movement of the gear 20 to rotary movement of a piston or sleeve within the injector 10 to effect control of the fuel charge. At the time of fuel ignition in the cylinder 15, a rotatable cam 22 drives a plunger 23 to eject fuel through the nozzle 14.

In a conventional diesel engine comprising a plurality of cylinders 15 and injectors 10, each with rack and pinion gears 20 and 21, it is usual to measure the fuel consumed by an engine by metering the total fuel input and fuel output of the injectors 10 and registering a difference therebetween. The enbodiments of the present invention illustrated in block diagrams of FIGS. 2 and 3 relate to apparatus and to a system in which two variable parameters of the engine are continuously monitored and are combined in a predetermined algorithm with two constant parameters of the engine to result in a determination of fuel consumption, this being achieved without altering the fuel lines of the engine in order to pass the fuel through a mechanical device such as a turbine wheel to measure quantity of flow.

Figure 2:
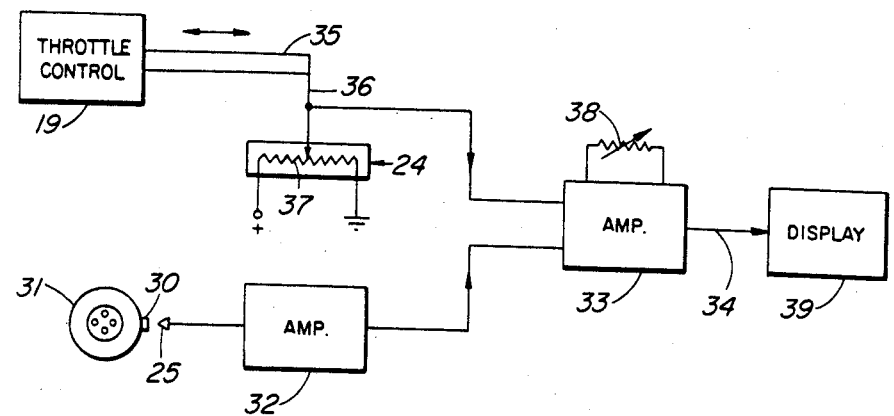
FIG. 2 is a block diagram of one embodiment of the present invention.
Figure 3:
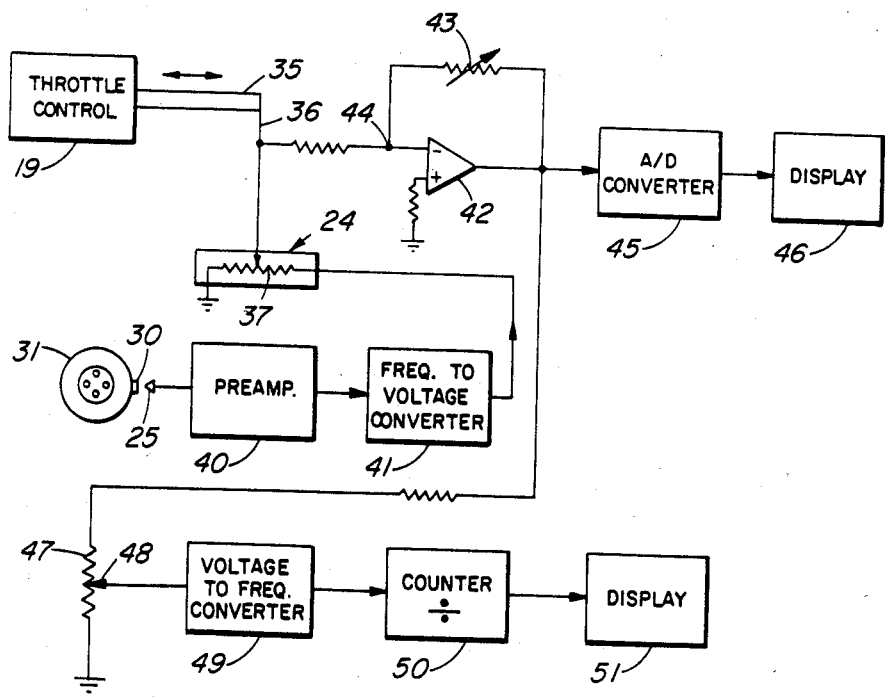
FIG. 3 is a more detailed block diagram of another embodiment of the present invention.

The apparatus of FIGS. 2 and 3 functions on the premise that the fuel consumed has been measured precisely by the injectors 10 of the engine. As noted, the speed and power of the engine is adjusted by the throttle 19 moving the gears 20 and 21 for controlling the fuel charge of each injector 10. Since linear displacement of the gear 20 is directly proportional to the quantity of fuel charge contained in an injector 10, the amount of fuel being delivered to each cylinder may be sensed by a ratiometric rack movement transducer 24 that is mechanically linked to the gear 20. This comprises one of the operating variables of the engine, the other variable being the rotary speed of the engine which is monitored by means of optical or magnetic sensing means, the latter being shown in the figures as a tachometer pickup 25.

In general, the apparatus and system illustrated in the figures functions according to an electrical model of the engine being monitored and processes the variables and constants thereof to produce a voltage that is proportional to the fuel being consumed. The electrical model to which reference is made is based on the following algorithm:

Fuel Rate=PIC/R where:
P=Rotary speed of the engine (RPM)
I=Maximum fuel charge of an injector
C=The number of working cylinders per revolution
R=Rack displacement The foregoing algorithm may also be expressed as follows:

Fuel Rate=(P/R)IC

Alternatively, if the constants I and C are multiplied together and called K, the algorithm can be written as:

Fuel Rate=(P/R)K

A simplified form of the present invention in the block diagram of FIG. 2 shows the pickup 25 in cooperative relation with a permanent magnet 30 mounted on the rim of an engine flywheel 31.

An amplifier 32, having an input to which the pickup 25 is connected amplifies the signal induced in the pickup 25 and produces an output signal that is proportional to the rotary speed of the engine and which is applied to one input of a dual-input multiplier means shown as an amplifier 33 having a single output 34.

The throttle control means of the engine is depicted as a block 19 which is connected by means of a mechanical link 35 to a slider 36 of the transudcer 24 which is shown as a slide potentiometer 37.

One end of the potentiometer 37 is connected to a source of direct current operating voltage whereas the other end is grounded. Linear displacement of the link 35 results in a corresponding movement of the slider 36 which taps off more or less of the operating voltage to produce an output signal that is proportional to the fuel charge of one injector 10. This signal is connected to the second input of the amplifier 33. Although not clearly indicated in FIG. 2, it will be understood that an output signal appearing at the output 34 corresponds to the product of the first and second input signals to the amplifier 33 and to a constant multiplier that corresponds to the number of working engine cylinders.

A resistive feedback network, shown generally as a variable resistor 38, provides a variable adjustment of the forward gain of the amplifier 33 and corresponds to a constant multiplier C. Thus, the signal appearing at the output 34 corresponds to the product of the first and second input signals as well as the constant C and is applied to an input of display apparatus 39 which is responsive to the product signal for displaying a rate of engine fuel consumption. Although not indicated, it will be understood that the apparatus 39 could be in the form of an analog meter or, for that matter, a digital apparatus comprising a microprocessor programmed to provide a visual readout, input and output ports under control of the program and a video monitor operatively connected to the output port.

Another embodiment is illustrated in a more detailed block diagram in FIG. 3 wherein it will be observed that in like engine components of the system in which the apparatus is employed, as well as the transducer 24 and the pickup 25, like numerical designations are used in both FIGS. 2 and 3.

A pulsating signal magnetically induced in the pickup 25 is first amplified by a preamplifier 40, the output of which is applied to the input of a frequency to voltage converter 41. The output of the converter 41 represents the variable P and comprises a direct current voltage that is proportional to the speed of the engine.

In accordance with the algorithm, the voltage P is divided by R. As the potentiometer 37 is a voltage divider, this can be done simply by applying the voltage P across the potentiometer 37 and obtaining from the output of the slider 36 a signal that corresponds to the term P/R.

The remaining step in the algorithm is to multiply the term P/R by the constant K. This operation is performed in an analog multiplier shown as an operational amplifier 42, the gain of which is adjustable by means of a resistive feedback network shown as a variable resistor 43 which comprises the feedback loop. By adjusting the gain of the amplifier 42 to the value K, and applying the voltage P/R to an input 44, the output will be (P/R)K. This output is a direct current voltage that is proportional to the rate of fuel consumption.

Selection of appropriate component values in the circuit heretofore described will result in a convenient relationship of (P/R)K to fuel used. An example of such a relationship is 10 mv per liter per hour.

The output from the amplifier 42 may subsequently be fed to one more indicating devices such as the analog voltmeter and microprocessor of FIG. 2. Additionally, or alternatively as the case may be, the output signal may also be applied to digital meter apparatus, bar graph apparatus, and the like to provide a convenient rate reading of fuel consumption in terms of volume units of fuel consumed per unit time. A typical example would be liters per hour. To this end, the output of the amplifier 42 is shown coupled to an analog digital converter 45 having its output connected to an LCD display 46.

Provision is also made in the apparatus of FIG. 3 for indicating and recording the total fuel consumed by the engine.

A sample of the output signal from the amplifier 42 is applied across a voltage divider in the form of a calibration potentiometer 47. The voltage developed at a slider 48 is applied to a voltage to frequency converter 49, the output of which is a high frequency alternating current signal recurring at a frequency related to the magnitude of the voltage at the slider 48. The output of the converter 49 is then divided down by means of a binary counter 50 that produces, for example, one pulse for each one-tenth liter of fuel consumed. The counter pulse is then applied to a counter and display apparatus 51 which displays the counted signal in terms of volume units of fuel consumed.

It will be apparent to those skilled in the art that the embodiments of the invention heretofore described may be substantially varied to meet particular specialized requirements without departing from the true spirit and scope of the invention disclosed. The foregoing embodiments are therefore not to be taken as indicative of the limits of the invention but rather as exemplary structures of the invention which is defined by the claims appended hereto.

What I claim is:

1. In an internal combustion engine having a plurality of adjustable-volume fuel injectors metering fuel to corresponding ones of engine cylinders at a unit volume rate adjustably responsive to the setting of a manual throttle control comprising a rack gear engaging a pinion gear of each injector for predetermining the volume of an injection chamber thereof, a fuel input line leading to each chamber from a fuel source, a fuel overflow line returning from each chamber to the fuel source and a fuel output line communicating each chamber with a corresponding engine cylinder, the improvement comprising, in combination:

monitor means generating an alternating current signal at a frequency related directly to the rotary speed of the engine;

signal converter means adapted to receive the alternating current signal and converting same to a direct current voltage proportional to the rotary speed of the engine;

potentiometer means mechanically linked to the rack gear for linearly tracking the lateral displacement thereof, the potentiometer means having a pair of terminals connected to the signal converter means to receive the direct current voltage as a source of operating voltage and a slider terminal at which is generated a quotient signal representing the direct current voltage divided by the lateral displacement of the rack gear which is proportional to the precise unit volume fuel charge of one injector;

multiplier means having an input connected to the slider terminal and an output generating a signal corresponding to the product of the quotient signal and a constant multiplier representing the number of working engine cylinders;

first display means coupled to the multiplier means and responsive to the output signal for displaying a precise rate of engine fuel consumption;

a calibration potentiometer having a pair of terminals connected across the output of the multiplier means;

a voltage to frequency converter having an input connected to a slider terminal of the calibration potentiometer and an output producing a high frequency alternating current signal related to the magnitude of the voltage at the slider terminal;

a binary counter adapted to receive the high frequency alternating current signal and to divide down same to a predetermined rate corresponding to the quantity of fuel consumed; and second display means coupled to the binary counter and responsive to the divided signal for displaying the quantity of fuel consumed.

2. A method for measuring fuel consumption in an internal combustion engine having a plurality of adjustable-volume fuel injectors metering fuel to corresponding ones of engine cylinders at a unit volume rate adjustably responsive to the setting of a manual throttle control comprising a rack gear engaging a pinion gear of each injector for predetermining the volume of an injection chamber thereof, a fuel input line leading to each chamber from a fuel source, a fuel overflow line returning from each chamber to the fuel source and a fuel output line communicating each chamber with a corresponding engine cylinder, comprising the steps of:

generating an alternating current signal at a frequency related directly to the rotary speed of the engine;

converting the alternating current signal to a direct current voltage proportional to the rotary speed of the engine;

linearly tracking the lateral displacement of the rack gear via potentiometer means and generating a quotient signal at a slider terminal thereof representing the direct current voltage divided by the lateral displacement of the rack gear which is proportional to the precise unit volume fuel charge of one injector;

generating a product of the quotient signal and a constant multiplier representing the number of working engine cylinders;

displaying a precise rate of engine fuel consumption coresponding to the product of the quotient signal and the constant multiplier;

converting the product of the quotient signal and the constant multiplier to a low frequency counter signal recurring at a frequency related to the magnitude of the product of the quotient signal and the constant multiplier;

counting the recurrences of the counter signal; and displaying the counted recurrences as precise quantified units of fuel consumed.

3. The improvement as claimed in claim 1 wherein the multiplier means comprises an operational amplifier having an adjustable feedback loop for setting the amplifier gain to correspond to the predetermined constant multiplier and wherein the output signal is a second direct current voltage that is proportional to the rate of fuel consumption.

4. Apparatus as claimed in claim 3 wherein the display means comprises an analog voltmeter calibrated in predetermined volume units of fuel consumed per unit time.

5. The improvement as claimed in claim 3 wherein the first display means comprises an analog to digital converter operatively connected to a digital display.

6. The improvement as claimed in claim 3 wherein the first display means comprises a microprocessor programmed to provide a visual readout, input and output ports under control of the program and a video monitor operatively connected to the output port.

7. A method as claimed in claim 2 wherein the step of converting the product of the quotient signal and the constant multiplier to a low frequency counter signal comprises the intermediate steps of:

converting the product of the quotient signal and the constant multiplier to a high frequency alternating current signal recurring at a frequency related to the magnitude of the product of the quotient signal and the constant multiplier; and dividing down the high frequency alternating current signal to the low frequency counter signal.

* * * * *